US012617017B2

(12) United States Patent
Ye et al.

(10) Patent No.: US 12,617,017 B2
(45) Date of Patent: May 5, 2026

(54) SYSTEMS AND METHODS FOR LASER ADDITIVE MANUFACTURING FOR STRUCTURED BATTERY COMPONENTS

(71) Applicant: Lawrence Livermore National Security, LLC, Livermore, CA (US)

(72) Inventors: Jianchao Ye, Tracy, CA (US); Yiran Xiao, Dublin, CA (US); Zhen Qi, Tracy, CA (US); Erika Paola Ramos Guzman, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 369 days.

(21) Appl. No.: 18/202,739

(22) Filed: May 26, 2023

(65) Prior Publication Data

US 2023/0373005 A1     Nov. 23, 2023

Related U.S. Application Data

(63) Continuation-in-part of application No. PCT/US2023/017599, filed on Apr. 5, 2023, which is
(Continued)

(51) Int. Cl.
*B22F 10/16*        (2021.01)
*B22F 1/105*        (2022.01)
(Continued)

(52) U.S. Cl.
CPC ............. *B22F 10/16* (2021.01); *B22F 1/105* (2022.01); *B22F 12/41* (2021.01); *B22F 12/49* (2021.01);
(Continued)

(58) Field of Classification Search
CPC .......... B22F 12/58; B22F 1/105; B22F 10/16; B22F 12/41; B22F 12/49; B22F 12/53;
(Continued)

(56) References Cited

U.S. PATENT DOCUMENTS

2017/0341145 A1    11/2017    Foster et al.
2018/0114979 A1     4/2018    Yoon et al.
(Continued)

FOREIGN PATENT DOCUMENTS

CN        102013332 A    4/2011
CN        107710455 A    2/2018
(Continued)

OTHER PUBLICATIONS

International Search Report and Written Opinion for corresponding PCT International Application No. PCT/US2024/030947 mailed Sep. 23, 2024, 12 pages.
(Continued)

*Primary Examiner* — Jessee R Roe
(74) *Attorney, Agent, or Firm* — HARNESS, DICKEY & PIERCE, P.L.C.

(57)        ABSTRACT

The present disclosure relates to a method for creating a powder for use in a selective laser sintering additive manufacturing (AM) application to form a battery component. In one aspect the method may comprise providing a battery component active material, a carbon material and a binder material. The active material and the binder material are mixed together in a first ratio in a mixer for a first time period, to carry out a first mixing operation, to produce a first mixture of active material and binder material. Carbon material may then be added to the first mixture of active material and binder material in a second ratio. The carbon material and the first mixture of active material and binder material may then be mixed for a second time period in a second mixing operation to form a homogeneously mixed powder.

19 Claims, 11 Drawing Sheets

Related U.S. Application Data a continuation of application No. 17/714,599, filed on Apr. 6, 2022.

(51) Int. Cl.
| | |
|---|---|
| *B22F 12/41* | (2021.01) |
| *B22F 12/49* | (2021.01) |
| *B22F 12/53* | (2021.01) |
| *B22F 12/58* | (2021.01) |
| *B33Y 10/00* | (2015.01) |
| *B33Y 30/00* | (2015.01) |
| *B33Y 40/10* | (2020.01) |
| *B33Y 70/10* | (2020.01) |
| *B33Y 80/00* | (2015.01) |

(52) U.S. Cl.
CPC .............. *B22F 12/53* (2021.01); *B22F 12/58* (2021.01); *B33Y 10/00* (2014.12); *B33Y 30/00* (2014.12); *B33Y 40/10* (2020.01); *B33Y 70/10* (2020.01); *B33Y 80/00* (2014.12); *B22F 2301/052* (2013.01); *B22F 2302/40* (2013.01)

(58) Field of Classification Search
CPC ......... B22F 15/58; B33Y 30/00; B33Y 40/10; B33Y 70/10; B33Y 80/00; B33Y 10/00
See application file for complete search history.

(56) References Cited

U.S. PATENT DOCUMENTS

| | | | |
|---|---|---|---|
| 2018/0151864 A1 | 5/2018 | Huang et al. | |
| 2021/0249657 A1 | 8/2021 | Shin et al. | |
| 2021/0280842 A1 | 9/2021 | Shin et al. | |
| 2022/0263094 A1* | 8/2022 | Tu .................... | H01M 10/0525 |
| 2023/0373005 A1 | 11/2023 | Ye et al. | |

FOREIGN PATENT DOCUMENTS

| | | |
|---|---|---|
| CN | 110655114 | 1/2020 |
| CN | 110655114 A | 1/2020 |
| KR | 20220094949 | 7/2022 |
| KR | 20220094949 A | 7/2022 |

OTHER PUBLICATIONS

Ahmed, S., Nelson, P. A., Gallagher, K. G. & Dees, D. W. Energy impact of cathode drying and solvent recovery during lithium-ion battery manufacturing. Journal of Power Sources 322, 169-178, (2016).

Ye, J. et al. Energy coupling mechanisms and scaling behavior associated with laser powder bed fusion additive manufacturing. Advanced Engineering Materials 21, 1900185, (2019).

In, J. B. et al. Facile fabrication of flexible all solid-state micro-supercapacitor by direct laser writing of porous carbon in polyimide. Carbon 83, 144-151, (2015).

Ye, J. et al. Ultra-Low-Density Digitally Architected Carbon with a Strutted Tube-in-Tube Structure. Nature Materials Accepted.

Acord, K. A. et al. Morphology, microstructure, and phase states in selective laser sintered lithium ion battery cathodes. Journal of Materials Processing Technology 288, 116827, (2021).

Maurel, A. et al. Considering lithium-ion battery 3D-printing via thermoplastic material extrusion and polymer powder bed fusion. Additive Manufacturing 37, 101651, (2021).

Gibson, I., Rosen, D., Stucker, B., Khorassani, M. (2021), Additive Manufacturing Technologies, Springer, Cham., available online Nov. 11, 2020, https://doi.org/10.1007/978-3-030-56127-7_5, in view of Foster et al. (US 20170341145A1).

Ludwig et al., Powder-Based Additive Manufacturing of Li-Ion Batteries and Micropowder Mixing Characteristics, Proceedings of the ASME 2017 12th International Manufacturing Science and Engineering Conference, published online Jul. 24, 2017.

International Search Report and Written Opinion for International application No. PCT/US2023/017599 mailed Aug. 7, 2023, 10 pages.

U.S. Appl. No. 17/714,599, filed Apr. 6, 2022, Jianchao Ye.

Cole, section V, history of system claims, NTP v. RIM: The Diverging Law Between System and Method Claim Infringement, Pierce Law Review, vol. 5, No. 2, pp. 34-365, 2007 (Year: 2007).

Continuous 3D Printing: what are the solutions on the market?, 3Dnatives, published Jan. 14, 2021 at https://www.3dnatives.com/en/continuous-3d-printing-140120204/, last accessed Feb. 17, 2023 (Year: 2021).

\* cited by examiner

FIGURE 7B
FIGURE 7D
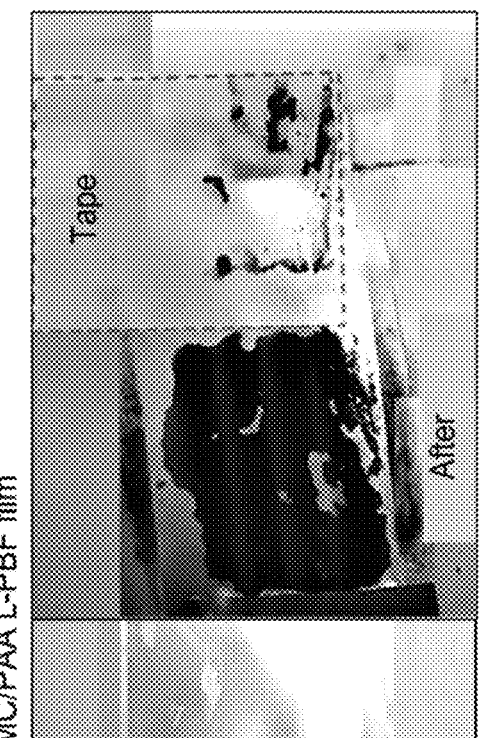
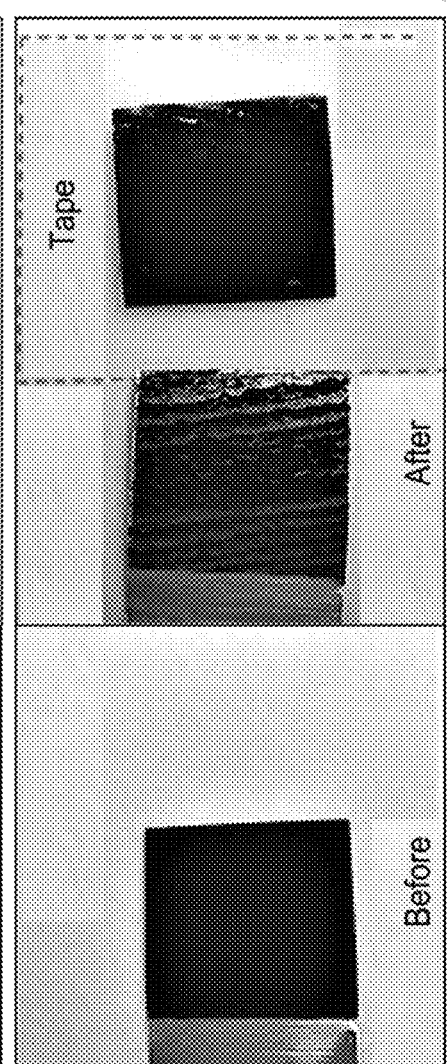
NMC/PAA L-PBF film
LiCoO₂ commercial film
FIGURE 7A
FIGURE 7C

SYSTEMS AND METHODS FOR LASER ADDITIVE MANUFACTURING FOR STRUCTURED BATTERY COMPONENTS

CROSS-REFERENCE TO RELATED APPLICATIONS

This application is a bypass continuation-in-part patent application which claims priority to PCT International Application No. PCT/US23/17599, filed Apr. 5, 2023, which in turn claims priority to U.S. patent application Ser. No. 17/714,599 filed on Apr. 6, 2022. The entire disclosures of the above applications are incorporated herein by reference.

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to systems and methods for manufacturing batteries and components thereof, and more particularly to systems and methods for mixing different material components to form a homogeneous powder mixture which is well suited for use in various additive manufacturing applications, and particularly so in manufacturing battery components using a selective laser sintering additive manufacturing process.

BACKGROUND

The statements in this section merely provide background information related to the present disclosure and may not constitute prior art.

Accelerated adoption of lithium batteries for electric vehicles (EVs) and grid storage requires lowering battery manufacturing costs while retaining high power and energy densities. Although tape casting-based, roll-to-roll manufacturing has enabled lithium-ion batteries (LIBs) to reach a cell-level cost of $107/kWhrated (2021 BatPaC, ANL) at the present time. And there is strong interest in still further cost reduction and performance improvements for LIBs. According to BatPaC cost analysis, the cell manufacturing represents 17.1% of total cost of manufacturing a LIB, from which electrode processing contributes the most.

LIB manufacturing has traditionally been expensive for a number of reasons. One is the use of solvents during processing (e.g., N-Methylpyrrolidone ("NMP"), H2O, etc.). The use of solvents necessitates long drying times and drives high energy consumption. Moreover, many solvents such as NMP are toxic to humans and present hazards for the environment, requiring expensive recovering and safety protocols. Therefore, the elimination of the use of solvent in LIB manufacturing processes has particularly strong interest.

Besides the cost reduction, battery performance improvement, especially in LIBs with higher energy and power densities, is also presently being sought to accelerate the electrification revolution. Simply thickening a battery electrode in the tape-casting method increases energy density but lowers power density. To retrieve the power density, fast ionic and electronic transport channels are critical in the designs of the structured electrodes. Various technologies have been proposed to generate the structured electrodes, such as casting head designs, laser hole-drilling, 3D scaffolds with loaded active materials, and 3D printing. However, the use of a solvent, the low integration ability and high processing cost of present day manufacturing technologies, are all challenges that still need to be addressed.

Still another challenge when manufacturing battery components for use in batteries such as LIBs, using a selective laser sintering ("SLS") Additive Manufacturing ("AM") process, is obtaining a homogeneous mixture of powder from the constituent components being used to form the powder mixture. For example, it is important both for electrical performance, as well as for good adhesion of the sintered powder to an underlying metal substrate, for example a layer of aluminum foil, that the constituents of the powder form a homogeneous mixture.

SUMMARY

This section provides a general summary of the disclosure, and is not a comprehensive disclosure of its full scope or all of its features.

In one aspect the present disclosure relates to a system for making an electrically conductive battery component. The system uses a metal layer forming a planar metal substrate, and a powder deposition component for applying a powder to form a powder layer on the planar metal substrate. A laser is used and configured to generate a laser beam to selectively sinter portions, or all, of the powder layer using a predetermined beam scanning pattern. A subsystem is used to remove portions of the powder layer that are not sintered by the laser to leave a planar finished material layer.

In another aspect of the system the metal layer comprises an aluminum layer.

In another aspect of the system the powder deposition component comprises an electrostatic spray gun for imparting an electrical charge to the powder as the powder is discharged from a nozzle of the electrostatic spray gun.

In another aspect of the system the laser comprises a continuous wave $CO_2$ laser.

In another aspect of the system a laser power of between 1 W and 1 kW is used in operating the laser.

In another aspect of the system the laser is operated to provide a volumetric laser energy density ranging between about 0.1 $Wh/cm^3$ to about 2 $Wh/cm^3$.

In another aspect of the system the laser beam comprises a beam spot size diameter between 50 μm to 1 cm.

In another aspect of the system the laser is operated at a scan speed of 1 mm/second to 3000 mm/second.

In another aspect of the system the metal layer is entrained around a plurality of parallel rollers to form an endless metal layer, and moved incrementally as the laser is sintering the powder layer.

In another aspect of the system the powder comprises a dry powder mixture.

In another aspect of the system the dry powder mixture comprises a mixture of active material, carbon black and binder.

In another aspect of the system the active material comprises at least one of: Lithium Nickel Manganese Oxides (NMC 811, NMC 622, NMC 532, NMC 111); Lithium Nickel Cobalt Aluminum Oxide (NCA); Lithium Cobalt Oxide (LCO); Lithium Iron Phosphate; Graphite; Silicon; or a metal oxide including one or more of TiO2, Li4Ti5O12, Fe2O3 and SnO2.

In another aspect of the system the dry powder mixture includes a binder, and wherein the binder includes at least one of: Polyvinylidene fluoride (PVDF); Carboxymethyl cellulose (CMC); Polyacrylic acid (PAA); or Polytetrafluoroethylene (PTFE).

In another aspect the present disclosure relates to a system for making an electrically conductive battery component. The system includes a planar metal layer forming a planar metal substrate, an electrostatic spray gun, a laser and a vacuum subsystem. The electrostatic spray gun applies a dry powder mixture which forms a dry powder layer on the planar metal substrate. The laser is configured to generate a laser beam to selectively sinter portions, or all, of the dry powder layer using a predetermined beam scanning pattern, a predetermined laser power and a predetermined scanning speed. The vacuum subsystem removes portions of the powder layer that are not sintered by the laser to leave a planar finished material layer. The planar finished material layer is comprised of tracks of sintered powder separated by linear, powder free sections.

In another aspect of the system the dry powder mixture comprises a mixture of Lithium Nickel Manganese Cobalt Oxide (NMC), carbon black and polyvinylidene fluoride (PVDF).

In another aspect of the system the planar metal layer comprises a planar aluminum metal layer, and wherein the planar aluminum metal layer is entrained around a plurality of layers to form an endless planar aluminum layer which is moved incrementally after the laser scans a predetermined portion of the dry powder layer.

In another aspect of the system the laser beam comprises a beam spot diameter of between 50 μm to 1 cm.

In another aspect of the system the laser is operated at a scan speed of 1 mm/second to 3000 mm/second.

In still another aspect the present disclosure relates to a method for making an electrically conductive battery component. The method comprises arranging a metal layer to form a planar metal substrate, and depositing a powder layer on the planar metal substrate. The method further includes using a laser to generate a laser beam to selectively sinter portions, or all, of the powder layer using a predetermined beam scanning pattern. The method further includes removing portions of the powder layer that are not sintered by the laser to leave a planar finished material layer.

In still another aspect the method comprises forming the planar finished material layer into a rolled structure to form at least one of a cathode or an anode of a battery.

In still another aspect of the method, the operation of depositing a powder layer comprises depositing a powder mixture including Lithium Nickel Manganese Cobalt Oxide (NMC), carbon black and polyvinylidene fluoride (PVDF).

In still another aspect of the method, the arranging a planar metal layer to form a planar metal substrate comprises arranging an endless aluminum sheet around one or more rollers, driving the rollers to move the endless aluminum sheet laterally a predetermined distance between scans of the laser, and when the planar finished material layer is formed, cutting the planar finished material layer and rolling the planar finished material layer into the rolled structure.

In still another aspect the present disclosure relates to a method for creating a powder for use in a selective laser sintering additive manufacturing (AM) application to form a battery component. The method may comprise providing a battery component active material, a carbon material and a binder material. The method may further include mixing the battery component active material and the binder material together in a first ratio in a mixer for a first time period, to carry out a first mixing operation, to produce a first mixture of battery component active material and binder material.

The method may further include adding the carbon material to the first mixture of battery component active material and binder material in a second ratio, and mixing the carbon material with the first mixture of battery component active material and binder material for a second time period in a second mixing operation to form a homogeneously mixed powder.

In still another aspect the present disclosure relates to a method for creating a powder for use in a selective laser sintering additive manufacturing (AM) application to form a battery cathode. The method may comprise providing a cathode active material, a carbon material and a binder material. The method may further include mixing the cathode active material and the binder material together in a first ratio in a roller mixer for a first time period at a first rotational speed, to produce a first mixture of active material and binder material, the first ratio including a ratio of from 70:20 to 90:2 of the cathode active material and the binder material. The method may further include adding the carbon material to the first mixture of cathode active material and binder material in a second ratio in the roller mixer, the second ratio including a ratio of 10:90 to 2:98 of the carbon material and the first mixture of cathode active material and binder material. The method may further include mixing the carbon material with the first mixture of cathode active material and binder material in the roller mixer at a second predetermined speed for a second time period to form a homogeneous powder mixture.

In still another aspect the present disclosure relates to a system for forming a powder for use in a selective laser sintering additive manufacturing (AM) application to form a battery component. The system may comprise a rotational mixer configured to receive a battery component active material, a binder material and a quantity of mixing components. The rotational mixer may be used to mix the battery component active material and the binder material for a first predetermined time period, at a selected rotational speed, during a first mixing operation, to produce a first mixture of battery component active material and binder material. The rotational mixer may further be configured to mix a quantity of carbon material with the first mixture and with the plurality of mixing components, in a second ratio, at a second selected rotational speed during a second mixing operation, to form a homogeneously mixed powder.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIGS. 7A and 7B are images of an L-BPF fabricated NMC/PAA layer on Al foil before (FIG. 7A) and after (FIG. 7B) a peel test, showing only a small portion of the powder layer is detached from the substrate and suggesting excellent adhesion;

FIGS. 7C and 7D are images of a $LiCoO_2$ commercial cathode film before derived from tape casting before (FIG. 7C) and after (FIG. 7D) a peel test, showing much worse adhesion;

DETAILED DESCRIPTION

Example embodiments will now be described more fully with reference to the accompanying drawings.

The present disclosure is directed to a laser powder-bed fusion (L-PBF) approach for the manufacturing of electrodes. In a typical L-PBF process, a powder layer is spread onto a substrate, followed with laser scans with defined patterns to selectively densify the powders via melting and re-solidification. L-PBF has been widely explored for the additive manufacturing of complex metal parts. L-PBF manufacturing techniques have recently demonstrated the ability to create 3D parts having unique microstructures and improved mechanical properties.

The present disclosure provides for systems and methods for manufacturing the electrodes of lithium ion batteries ("LIBs"). A polymer binder is selectively melted by laser heating and bonds active material and carbon black together onto a current collector. This enables forming structured designs which facilitate Li+ transport through thick electrodes. The solvent-free L-PBF process of the present disclosure provides excellent scalability along with a high production rate. The process of the present disclosure significantly reduces manufacturing cost, energy consumption, and the environmental impact of manufacturing high-performing batteries.

Figure 1:
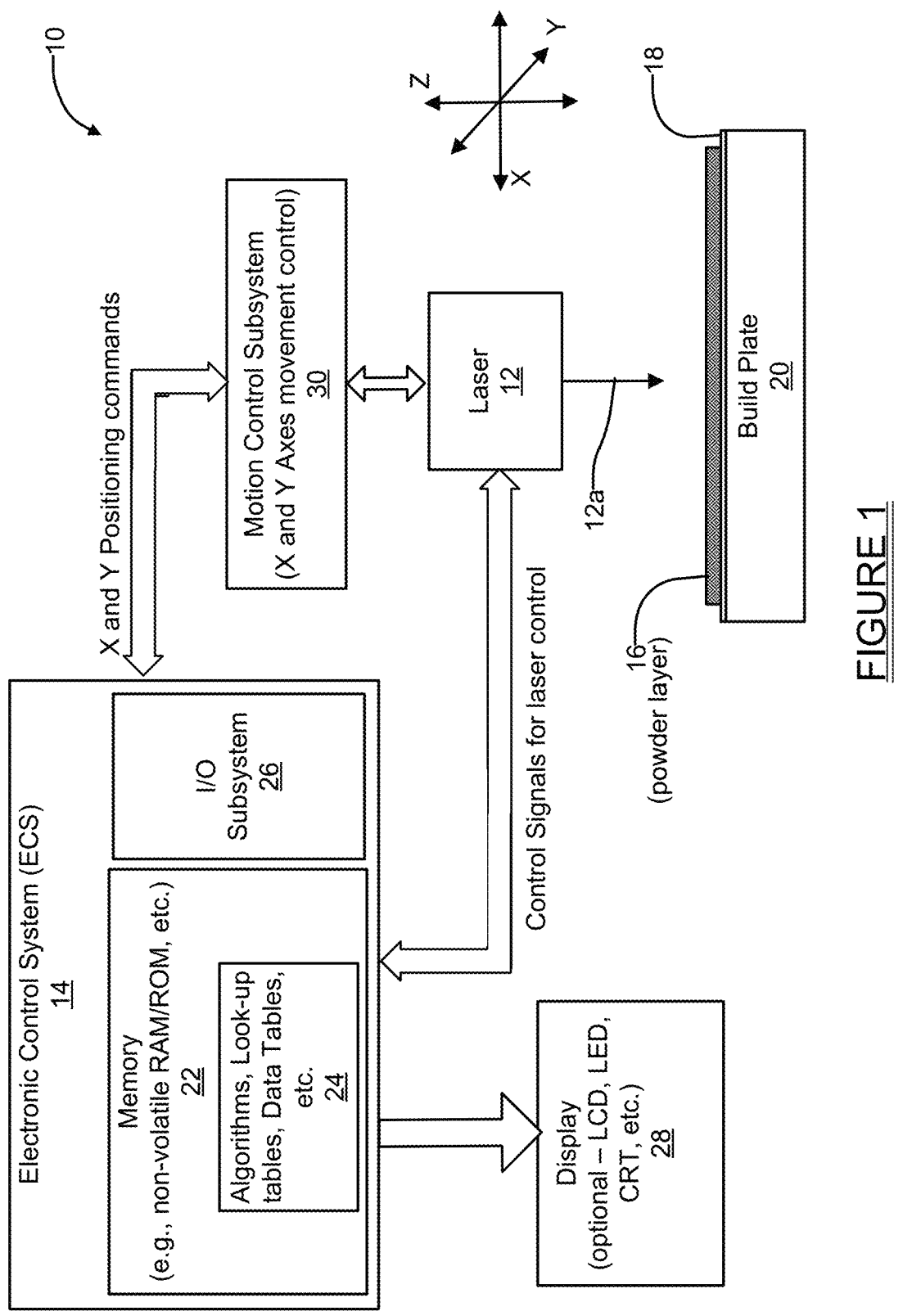
FIG. 1 is a high level view of one embodiment of a system for performing a laser powder bed fusion (L-PBF) operation in creating an electrically conductive component that can be used to form a battery component.

Referring to FIG. 1, a system 10 is shown for carrying out the L-PBF process and creating structured components that are well suited for creating current carrying elements of a battery, and particularly LIBs. A laser 12 is controlled by an electronic control system (ECS) 14 to fuse select portions of a powder layer 16 which is present on a planar layer of metal material 18 which forms a metallic layer substrate, which in turn is resting on a build plate 20. The layer of metal material is typically a layer of aluminum foil, although other metal materials such as nickel or copper, for example, could be used as well. The powder layer used may vary to meet the needs of a specific application, but in one embodiment dry powder NMC 811, carbon black and polyvinylidene fluoride (PVDF) binder are mixed with a desired compositional ratio (e.g., 9:0.5:0.5), and deposited, in one embodiment by spraying, onto the metal material layer 18. The metal material 18 layer in one embodiment may be Aluminum (Al). It will also be understood that the compositional ratio given above may be modified as needed to optimize the mixture for a specific application.

The ECS 14 may include a number of subsystems either integrated within it or separate but in communication with it, for control the laser 14 and overall operation of the manufacturing process. In the embodiment shown in FIG. 1 the ECS 14 includes a non-volatile memory 22, which may include one or more of a RAM, ROM, etc., along stored information pertaining to one or more of algorithms, look-up tables, data tables 24 for carrying out the L-PBF manufacturing process according to the present disclosure. An input/output (I/O) subsystem 26 may also be included in the ECS 14 for communicating with other components of the system 10, for example an external (optional) display subsystem (e.g., LCD, LED, CRT, desktop computer, laptop computer, smartphone, computing tablet, etc.). The I/O subsystem 26 may include suitable components for interfacing to one or more external subsystems, such as a serial interface (e.g., RS-232, RS-422, etc.), a parallel interface, a short range wireless communications protocol such as a BLUETOOTH® wireless communications protocol interface, a USB interface, an Ethernet communications interface, just to name a few possible types of interfaces. The I/O subsystem 26 may also be used to assist the ECS 14 in providing positioning commands to a motion control subsystem 30 which is being used to move the laser 14 along X and Y axes while carrying out the L-PBF operation. The motion control subsystem 30 may include suitable driving components for highly accurate X and Y axis positioning (e.g., stepper motors, linear actuators, etc.). The laser generates a beam 14a of a predetermined beam diameter which is used to melt select areas of the powder layer 16.

Figures 2, 2A:
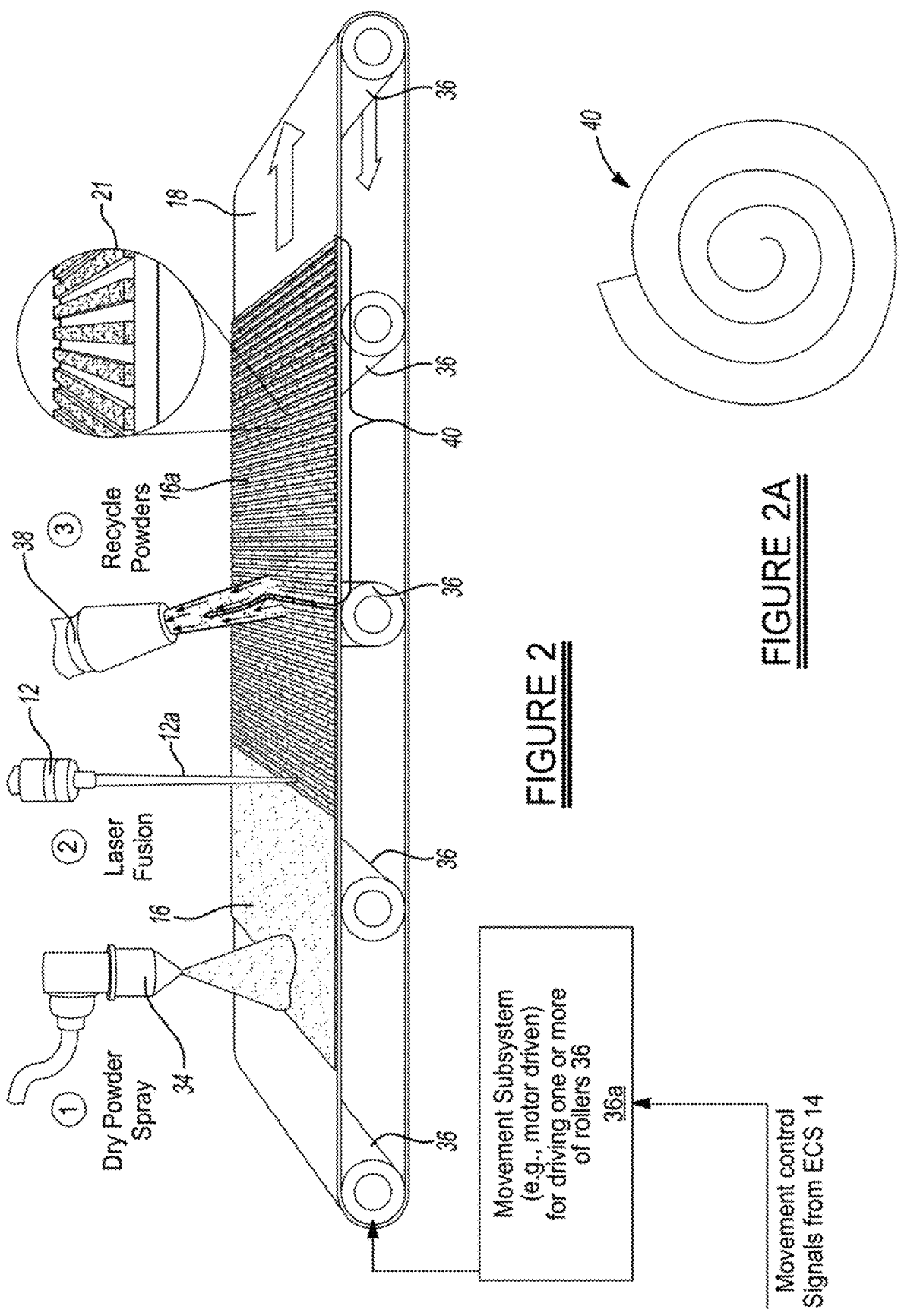
FIG. 2 is a high level diagram of operations that may be performed in forming a battery component such as an anode or cathode.
FIG. 2A shows a plan view of one example of the finished material created from the process of FIG. 2 after being rolled into a cylindrical shape to form an anode or cathode.

FIG. 2 shows a high level diagram illustrating various operations being performed, some of which involve using one or more components of the system 10 shown in FIG. 1. In FIG. 2 the dry powder which forms the powder layer 16 is deposited on a layer of metal material layer 18. One embodiment of the present disclosure involves using a dry powder sprayer 34 to apply the powder layer in a desired thickness, which in most applications will be a layer having a uniform thickness (e.g., typically between 0.02 mm and 0.1 mm), but which may vary considerably to meet the needs of a specific application. The dry powder in this example is sprayed onto the metal material layer 18 (e.g., layer of Al foil) using an electrostatic powder spray coating technique. In this process, the powder(s) is/are brought out from a reservoir (not shown) by an externally produced air flow, and pass by the spray gun nozzle, where a high voltage electrode (not shown) charges the particles as they flow past the high voltage electrode. The charged powder particles are attracted by the grounded metal layer 18 substrate and coated onto it. The loose powder film thickness can be adjusted by nozzle-substrate distance, carrier gas pressure and coating time, so that the thickness may range from tens of micrometers up to hundreds of micrometers in thickness. The powder(s) is/are loosely packed and can be blown off.

In manufacturing a cathode, as one example, dry powders of lithium nickel manganese cobalt oxide (e.g., NMC811) may be preferred. However, other materials such as, without limitation, other lithium nickel manganese cobalt oxides (NMC622, NMC532, NMC111), lithium nickel cobalt aluminum oxide (NCA), lithium cobalt oxide (LCO), lithium iron phosphate (LFP), etc., may be used as well. One or more of these just-mentioned powders may be mixed with carbon black (graphite, etc.), and Polyvinylidene fluoride (PVDF) for example PAA, CMC, PTFE, and other common battery binders, which acts as a binder. The powder(s) used are mixed with predetermined compositional ratios determined for a specific application. In manufacturing an anode, dry powders of graphite may be preferred. However, other materials such as silicon, metal oxides may be used as well. PVDF or other common battery binders may be mixed with the above anode materials to form the spray powder mixtures.

The laser 12 emits the laser beam 12*a* which melts select portions of the dry powder layer 16 in accordance with the pattern of movement of the laser 12. The laser 12 may be a continuous wave $CO_2$ laser, or possibly a continuous wave glass fiber laser. Taking the cathode as an example, dry powders of NMC 811 (can be other cathode materials such as NMC 622, NMC532, NMC111, NCA, Lithium Cobalt Oxide (LCO), Lithium Iron Phosphate (LFP), etc.)), can be mixed with carbon black (graphite, etc.), and PVDF or Pericetic Acid (PAA), Carboxymethyl cellulose (CIVIC), Polytetrafluorethylene (PTFE), and/or other common battery binders with certain compositional ratios.

The beam spot size of the laser beam 12*a* may vary significantly to suit specific applications, but it is expected that most applications will require a beam spot diameter of between about 50 μm to possibly 1 cm, or even larger. The laser power used will also vary significantly according to the specific application. In some embodiments a laser power of between 1 W and 1 kW will likely be preferred in operating the laser. Furthermore, it is expected that a volumetric laser energy density ranging between about 0.1 $Wh/cm^3$ to about 2 $Wh/cm^3$ will also be preferred for most applications. The speed used in scanning the laser 12 may vary significantly, but it is expected that in most applications a scan speed of between about 1 mm/second and 3000 mm/second will be preferred.

Optionally, as shown in FIG. 2, the metal layer 18 may be formed as a thin metal material (e.g., Al foil) over one or more rollers 36, and the metal layer moved incrementally laterally as the one or more rollers 36 are driven by a movement subsystem 36*a* (including, e.g., one or more DC stepper motors), as the laser 12 sinters the powder layer 16 in a raster scan-like pattern. This embodiment thus requires movement of the laser 12 back and forth along only one axis, as a highly controlled, incremental lateral movement on the order typically about 50 μm to about 100 mm of the metal material layer 18 is performed after each linear pass of the laser beam 12*a* using the one or more rollers 36.

A suitable tool or vacuum-like device or subsystem 38 is then used remove any un-bonded powders, leaving, in this example, line-like traces 16*a* of composite formed on the metal layer 18 which have an engineered thickness, height and spacing from adjacent composite traces. Portion 40 thus represents a finished material layer. The composite traces 16*a* are shown in highly enlarged fashion in section 2.1 of FIG. 2. The metal layer 18 may then be removed from the rollers 36, cut or sectioned as needed, and rolled together with a separator layer and a counter electrode layer to form a cylindrical cell, such as shown in FIG. 2A. Optionally, the metal layer 18 may be cut into several sections and stacked together with a separator layer and a counter electrode layer to form a multi-layer pouch cell. It is important to note that the above-described process does not involve the use of any solvents, nor does it require any drying operations, which both contribute to overall cost and/or environmental issues, and which can significantly increase the time needed to manufacture a battery component.

Figure 3:
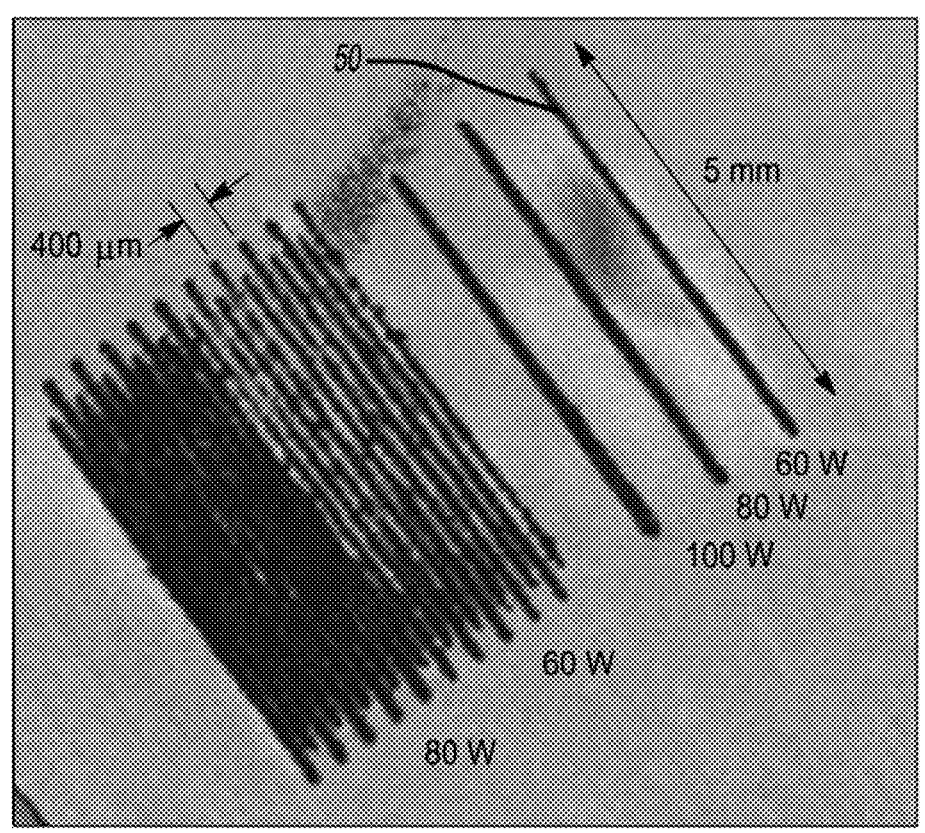
FIG. 3 is an image obtained using a scanning electron microscope (SEM) image showing multiple tracks of NMC/PAA using a 35 um gaussian beam profile generated by a Nd:YAG laser with a 500 mm/s scan speed, and using different laser power levels, to illustrate the resolution that is possible in creating line-like tracks using different laser power levels.

Referring to FIG. 3, an image obtained using a scanning electron microscope (SEM) image shows multiple tracks 50 of fused NMC/PAA using a 35 um gaussian beam profile generated by the laser 12, which in instance was an Ytterbium fiber laser with a 500 mm/second scan speed. The tracks 50 were created using different laser power levels ranging from 60 W to 100 W. The tracks 50 illustrate the resolution that was achieved in creating line-like tracks using different laser power levels. Track 50 separation of only 200 μm or even less is possible.

Figures 4, 5, 6:
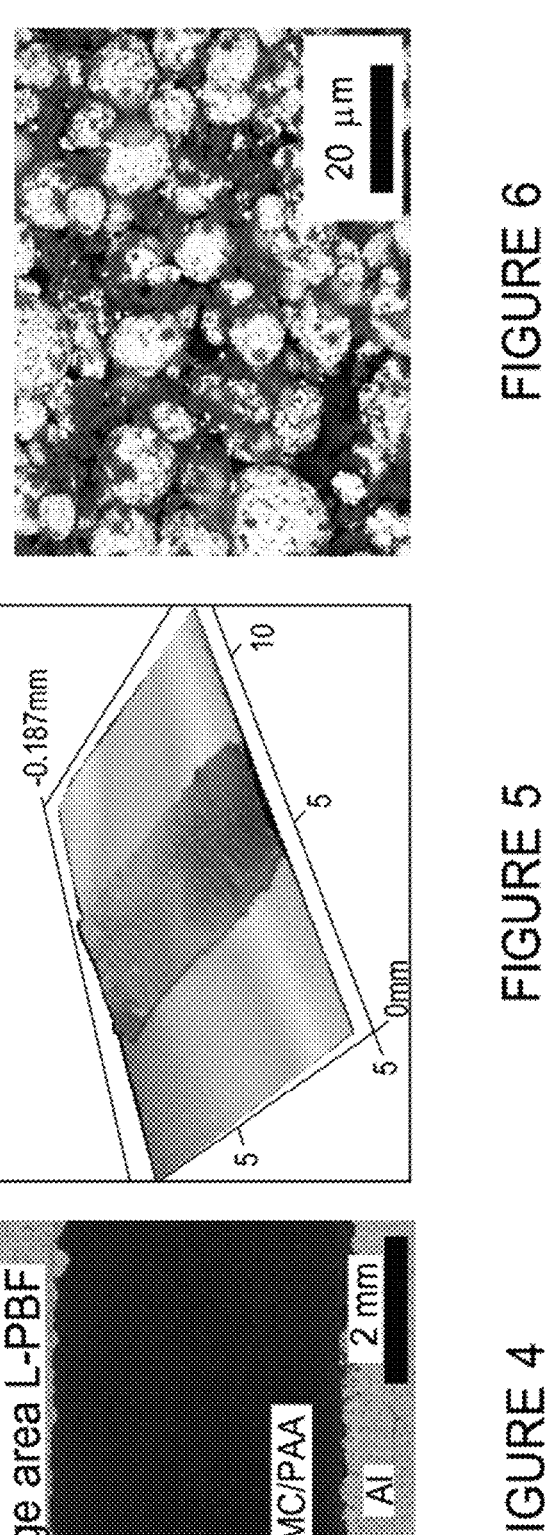
FIG. 4 is a top (i.e., plan view) SEM image of an L-PBF sintered NMC/PAA powder layer on Al foil using a 3.5 mm flat top $CO_2$ laser with 5 W power.
FIG. 5 is the height profile of the laser sintered NMC/PAA ribbon shown in FIG. 4, measured using a 3D digital microscope.
FIG. 6 is a SEM image of the L-PBF processed NMC/PAA powder layer on Al foil using a 3.5 mm flat top $CO_2$ laser with 5 W power and 4 mm/sec scan speed.

FIG. 4 is a top (i.e., plan view) SEM image of an L-PBF sintered NMC/PAA powder layer on Al foil using a 3.5 mm flat top $CO_2$ laser with 5 W power. FIG. 5 is a height profile for the surface shown in FIG. 4, measured using a 3D digital microscope. FIG. 6 is a SEM image of the L-PBF processed NMC/PAA 2 powder layer on Al foil using a 3.5 mm flat top $CO_2$ laser with 5 W power and 4 mm/second scan speed. The NMC particles are bonded together by PAA binder particles, with some regions that are directly exposed.

FIGS. 7A and 7B are images of an L-BPF fabricated NMC/PAA layer on Al foil before a peel test (FIG. 7A) and after the peel test (FIG. 7B), showing only a small portion of areas were peeled off by using SCOTCH® brand adhesive tape. These images suggest excellent adhesion between NMC particles as well as between NMC particles and Al foil using the manufacturing technique of the present disclosure.

FIGS. 7A and 7B are images of a $LiCoO_2$ (LCO) commercial cathode film before derived from tape casting before a peel test (FIG. 7C) using the same type of adhesive tape, and after the peel test (FIG. 7D). These images illustrate that significantly less adhesion of the NMC/PAA layer for the LCO cathode film is achieved from tape casting.

Figure 8:
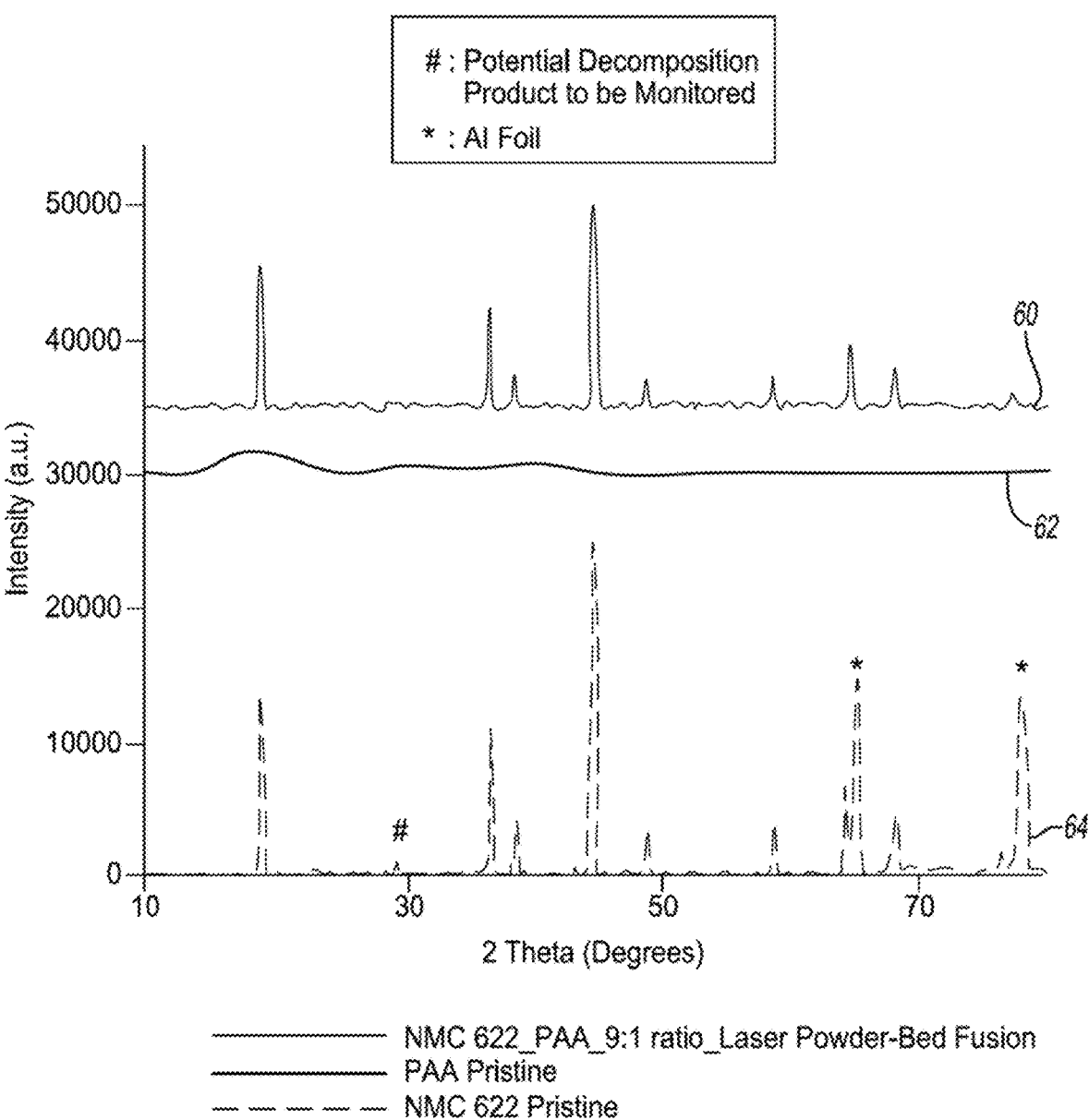
FIG. 8 shows X-ray diffraction pattern of a L-PBF processed NMC/PAA layer in comparison with pristine PAA and NMC 622 powders, with the results suggesting that the NMC 622 crystalline structure was preserved after laser processing.

FIG. 8 shows XRD patterns of NMC 622 PAA (9:1 ratio) fused using the L-BPF approach described herein, represented by plot 64; PAA Pristine represented by plot 62 and NMC 622 Pristine represented by plot 60. The crystalline structure of the NMC 622 is well preserved, which is critical in the demonstration of Li storage capability.

Figure 9:
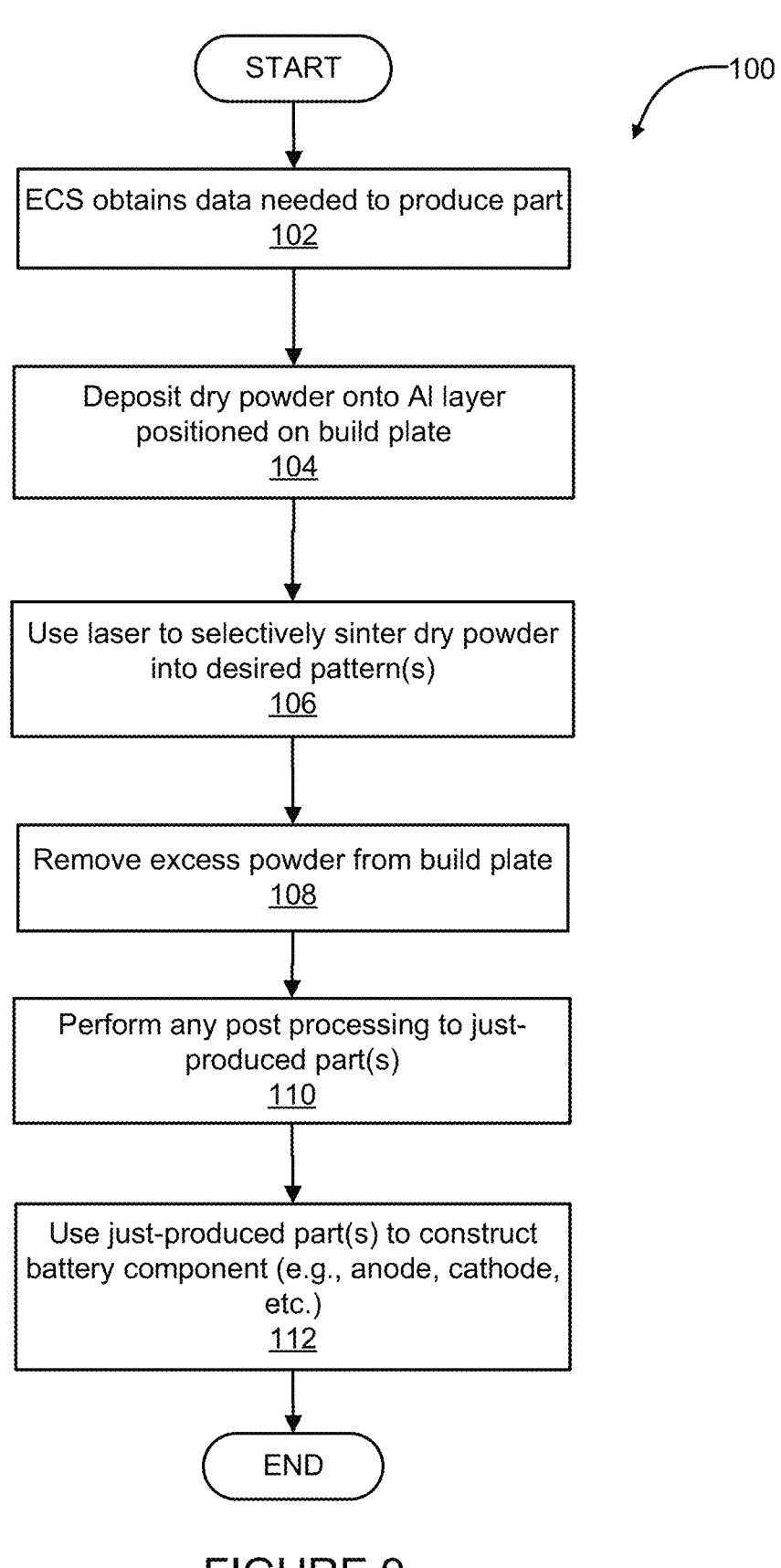
FIG. 9 is a high level flowchart showing various illustration in performing an L-PBF method on a powder (e.g., NMC/PAA 2) in forming a layer of material well suited for forming an electrically conductive battery component.

FIG. 9 is a high level flowchart 100 showing various illustration in performing an L-PBF method on a powder (e.g., NMC/PAA 2 or other powder mixture) in forming a layer of material well suited for forming an electrically conductive battery component. At operation 102 the ECS 14 may initially obtain the data needed to produce the part (e.g., cathode, anode, etc.). At operation 104 the dry powder is deposited, in one embodiment via a spray gun, onto a metal layer, for example an Al layer positioned on the build plate 20. The laser 12 is then used to selectively melt sections of the dry powder, in one example by using a line-by-line raster scanning pattern, which then re-solidify into one or more desired patterns, as indicated at operation 106. At operation 108 excess powder is removed from the build plate 20. Any further post processing operations may then be performed on the part being manufactured, as indicated at operation 110. At operation 112 the just-produced part(s) may be used to produce a battery component, for example an anode, a cathode, or all or a portion of a battery cell.

The system and method in its various embodiments described herein provides a number of advantages over previous electrode manufacturing processes. For one, no solvent is involved in the powder coating and structuring, making it environmentally benign. The methods disclosed herein also provide a low energy cost when comparted to previously used manufacturing techniques. Another advantage is that the electrostatic powder spray coating is readily scalable to dimensions of over square meters per minute. Still further, any unmelted powder can be reused, thus reducing waste and cost. The focused laser 12 can generate high-resolution patterns (e.g., <20 mm) with extremely fast speed (e.g., 3000 mm/s or even potentially higher) for high power-density designs. The cathode materials are firmly attached to the Al foil by laser-induced melting using the L-PBF process described herein. Partial carbonization at intermediate temperatures can also improve the electronic conductivity of the binder. The recoiling pressure under the laser beam 12a can introduce compressive force to further densify the porous layer in the thickness direction (i.e., Z direction), which may eliminate the need of calendaring. The extremely rapid cooling rate preserves the amorphous state of the binders, improving Li+ transport. Multilayer printing also allows for gradient chemical and morphological designs to be introduced into the part being manufactured.

The invention of the present disclosure thus provides a new electrode manufacturing technology that can significantly improve both energy and power densities while avoiding the use of a solvent to reduce energy consumption, production time, and environmental impact. The manufacturing approaches described herein are expected to have has a long-term impact on the future of battery technologies. While NMC cathodes have been described herein as being manufactured, the present disclosure is not limited to producing only cathodes. The teachings presented herein may be used for anode fabrication, which may solve the lithium plating issues and therefore further improve the rate and cycling performance of LIB's. Similarly, the teachings presented herein may be used to develop structured solid-state batteries by changing the cathode recipe with solid state electrolyte/cathode mixtures or by infilling the structured cathode with UV/thermally composite polymer electrolytes. These options further demonstrate the wide range of applicability of the new manufacturing techniques for battery technology described in the present disclosure.

It will also be noted that the manufacturing techniques described in the present disclosure can be used for the manufacture of not only LIBs, but also, without limitation, solid state lithium batteries, solid state ion batteries, and solid state sodium batteries, with reduced cost and improved performance.

Figure 10A:
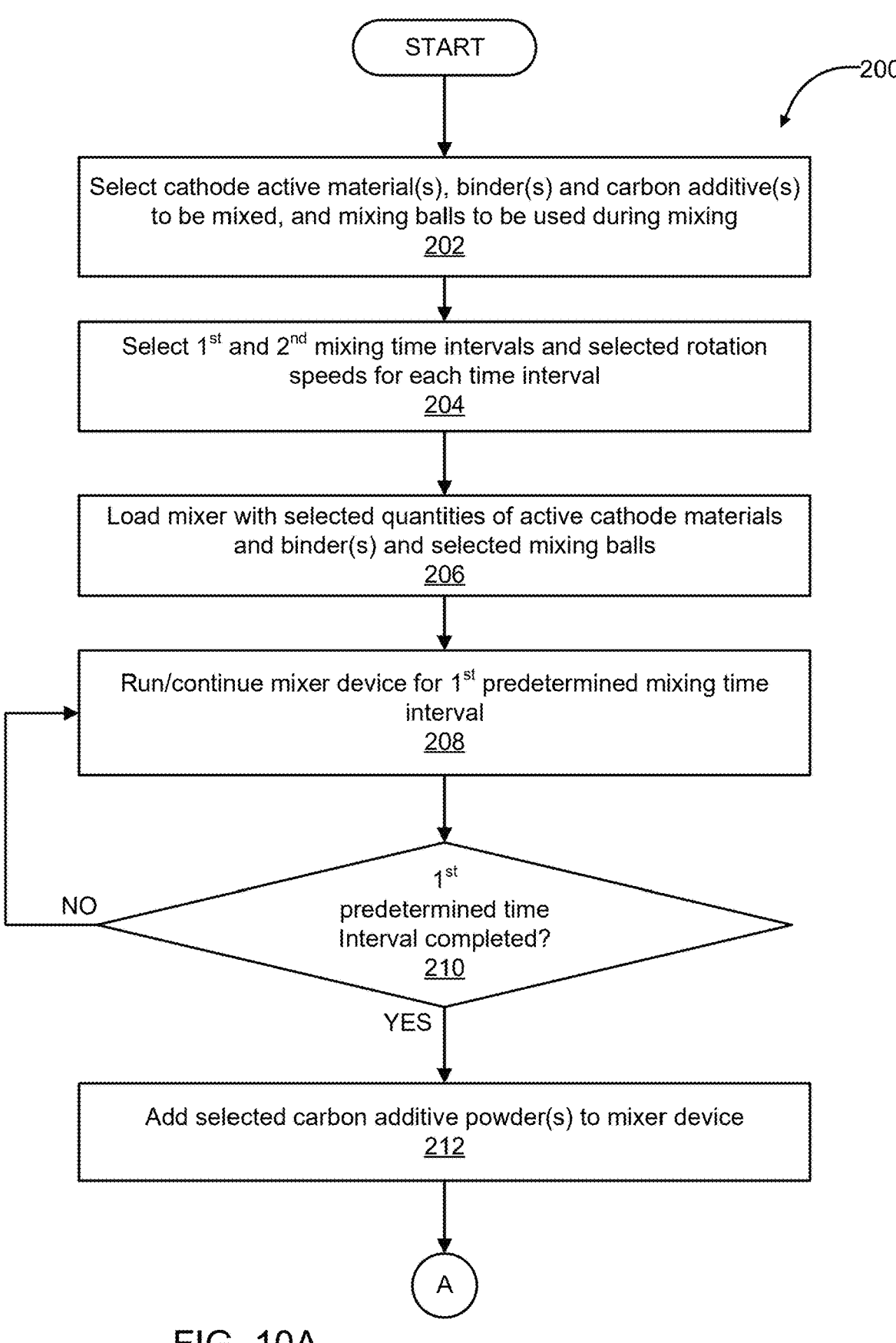
FIGS. 10A and 10B are a flowchart showing various operations that may be performed during one example of a mixing process, method or operation, to form a homogeneous mixture from an active material, a binder material and a carbon material.
Figure 10B:
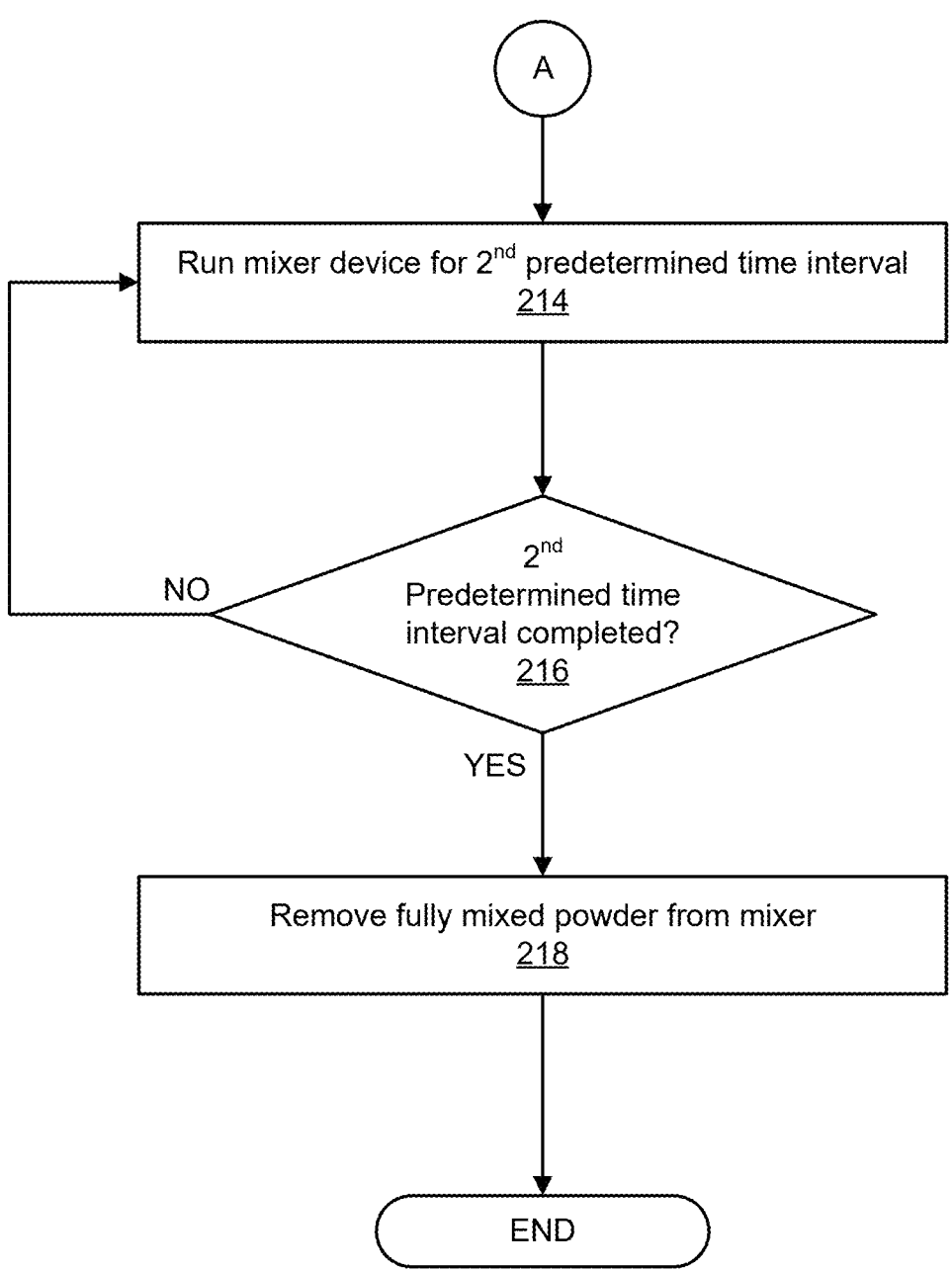

Referring now to FIGS. 10A and 10B, a flowchart 200 is shown setting forth various operations that may be performed in preparing a powder mixture for powder layer deposition in an AM sintering operation. The operations shown in flowchart 200 create a powder mixture from a plurality of constituent materials which has excellent homogeneity, and which helps in providing excellent electrical performance in a formed battery component, as well as helps with facilitating excellent adhesion of the printed powder material on a metallic surface, for example on an Al foil surface, when forming a battery component. The battery component may comprise a cathode or possibly other components of a battery as well. For convenience, the present disclosure will make reference to forming a cathode of a battery, although it will be appreciated that the methods described herein are not limited to just forming battery components, but may also be used to form a wide variety of components used in electrical devices and systems.

At operation 202 one or more specific battery component active materials, one or more binder materials, one or more carbon additives, and one or more types of mixing components are selected for use during the mixing operation. Merely for convenience, the battery component active materials will be referred to as "cathode active materials" throughout the following discussion. The cathode active materials may comprise, without limitation, one or more of dry powders of NMC 811, NMC 622, NMC532, NMC111, NCA, LCO, LFP, etc., or a desired mixture thereof. The carbon material(s) may comprise carbon black, graphite, graphene, carbon nanotubes, carbon fibers, etc. The binder (s) may be a Polyvinylidene fluoride (PVDF), for example and without limitation, PAA, CMC, PTFE, ceramic ionic conducting binders, Halide based solid state electrolytes; Oxyhalide based solid state electrolytes; Sulfide based solid state electrolytes; Oxide based solid state electrolytes; or a mixture thereof, or any other common binder. The mixing components may include any suitable elements that help to promote mixing in a rotational mixer, but in one embodiment the mixing components are various balls, and in one specific implementation are balls formed from acrylic or Al2O3 or YSZ, depending on the strength of the powder materials. For battery materials, the plastic balls generate even better mixing results that show less caking.

At operation 204 first and second mixing time intervals are selected along with rotational speeds to be used with a rotational mixer device for each of the time intervals. At operation 206 a suitable mixer device is loaded with the selected active cathode material(s), the selected carbon material(s) and the selected binder(s), along with the selected mixing balls. The mixer device may be any commercially available mixer suitable for mixing the selected materials together. One suitable mixer device is the SCIT6-S Analog Tube Roller available from Scilogex, LLC of Rocky Hill, CT. The ratio of active cathode material(s) to binder(s) may vary, but in some embodiments is between 70-20 to 90-2, with higher CAM contents preferred. During the first time interval, in some implementations of the method the rotation speed may be 25 rpm-150 rpm, and in some implementations more preferably between about 50 rpm to 100 rpm.

At operation 208 the mixer device is started and run for the first predetermined mixing time interval. In some implementations of the present method the predetermined mixing time interval may vary widely, but may be 6 hours to 24 hours, and in some implementations between 12 hours to 16 hours. The mixer may be controlled by the ECS 14 shown in FIG. 1, or by an external computer, laptop or any other stand-alone computing device. Still further, the mixing time may simply be set on the mixer device, provided the mixer device includes a user settable timer.

At operation 210, assuming the ECS 14 or other form of independent computing device/controller is being used to monitor and control operation of the mixer device, a will be made if the first predetermined mixing time interval is completed. If this the first predetermined time interval has been set using a timer on the mixer device, then this operation will be inherently performed by the mixer device. In either event, when the first predetermined time interval is completed, this concludes the first mixing operation or step. The result is a homogeneous first mixture of active material (s) and binder material(s).

At operation 212, in preparation for the second predetermined mixing operation, the selected carbon additive powder(s) is/are then added to the mixer device. The ratio of carbon additive powder(s) to the first mixture described above may vary significantly, but in some implementations of the present method is the ratio comprises a ratio of about 10:90 to about 2:98 of carbon material to the first mixture of active material and binder material. The mixing time for this second predetermined mixing operation may also vary significantly, but in some implementations/embodiments may be between 1 to 8 hours, and in some implementations/ embodiments between 1-2 hours.

Referring to FIG. 10B, at operation 214 the mixer device is run for the second predetermined time interval. In some embodiments the second predetermined time interval is from about 1 hour to about 8 hours, and in some embodiments more preferably between about 2-6 hours.

At operation 216, a check is made if the second predetermined time interval has expired. Again, the second predetermined time interval may be monitored by the ECS 14, by a different computing or timer device, or possibly simply set on the mixer device itself. When the second predetermined time interval is completed, the second mixing operation or step is complete. At operation 218 the fully mixed powder may then be removed from the mixer device and is ready to be used in an AM process where it will be sintered to a metal layer, for example an Al foil.

Figures 11A, 11B, 11C:
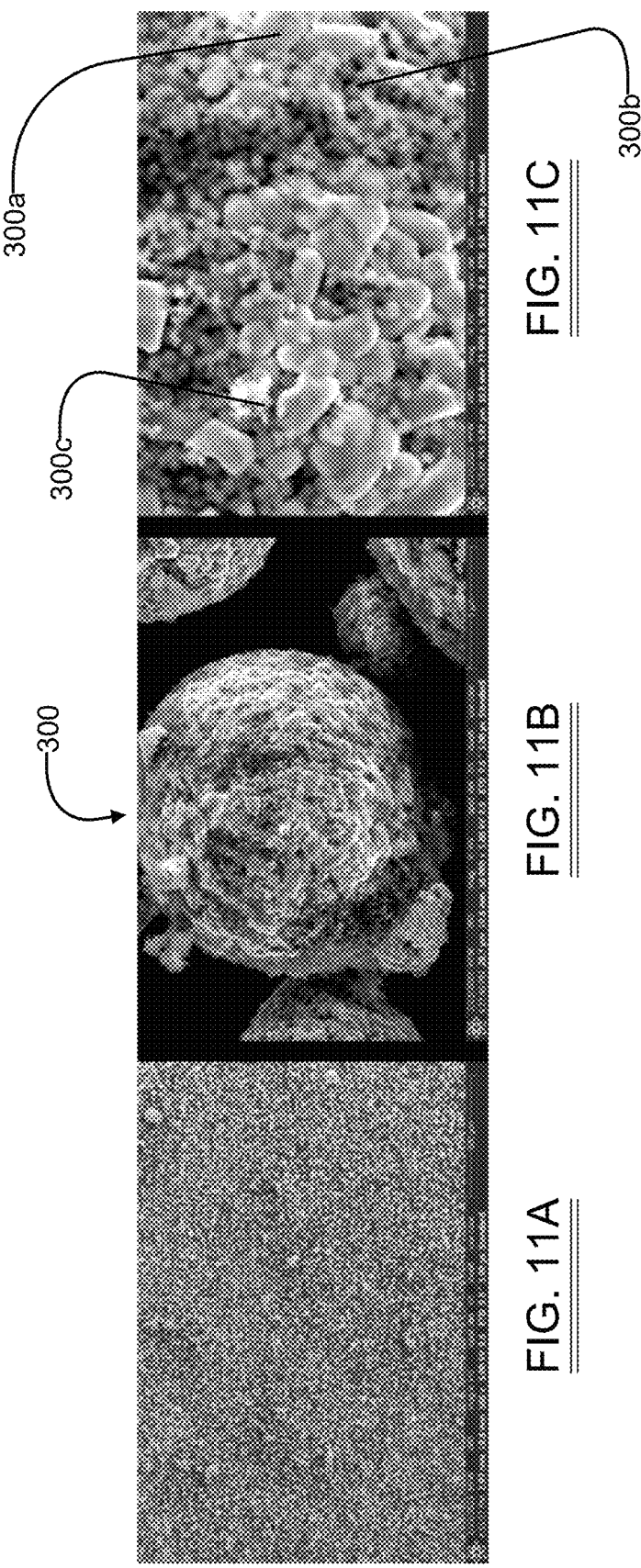
FIGS. 11A, 11B, and 11C show scanning electron microscope images of a powder mixture created using the teachings of the present disclosure, at three different magnification levels, and particularly illustrating the excellent mixing of the active material, the binder material and the carbon material in the final powder mixture.

FIGS. 11A, 11B and 11C show scanning electron microscope (SEM) images of a NMC811/nano-PVDF/CB (90:5:2) powder mixture after the above described mixing process is performed, at three different magnification levels. FIG. 11A shows a collection of the fully mixed powder particles, FIG. 11B shows one mixed powder particle 300, and FIG. 11C shows a highly enlarged portion of a surface of the powder particle 300. In FIG. 11C the larger crystals 300a are NMC crystals (1-10 um). The small spheres 300b are PVDF binder powder particles (100-500 nm), and the even smaller agglomerates 300c are carbon black (40-80 nm).

Figures 12, 13:
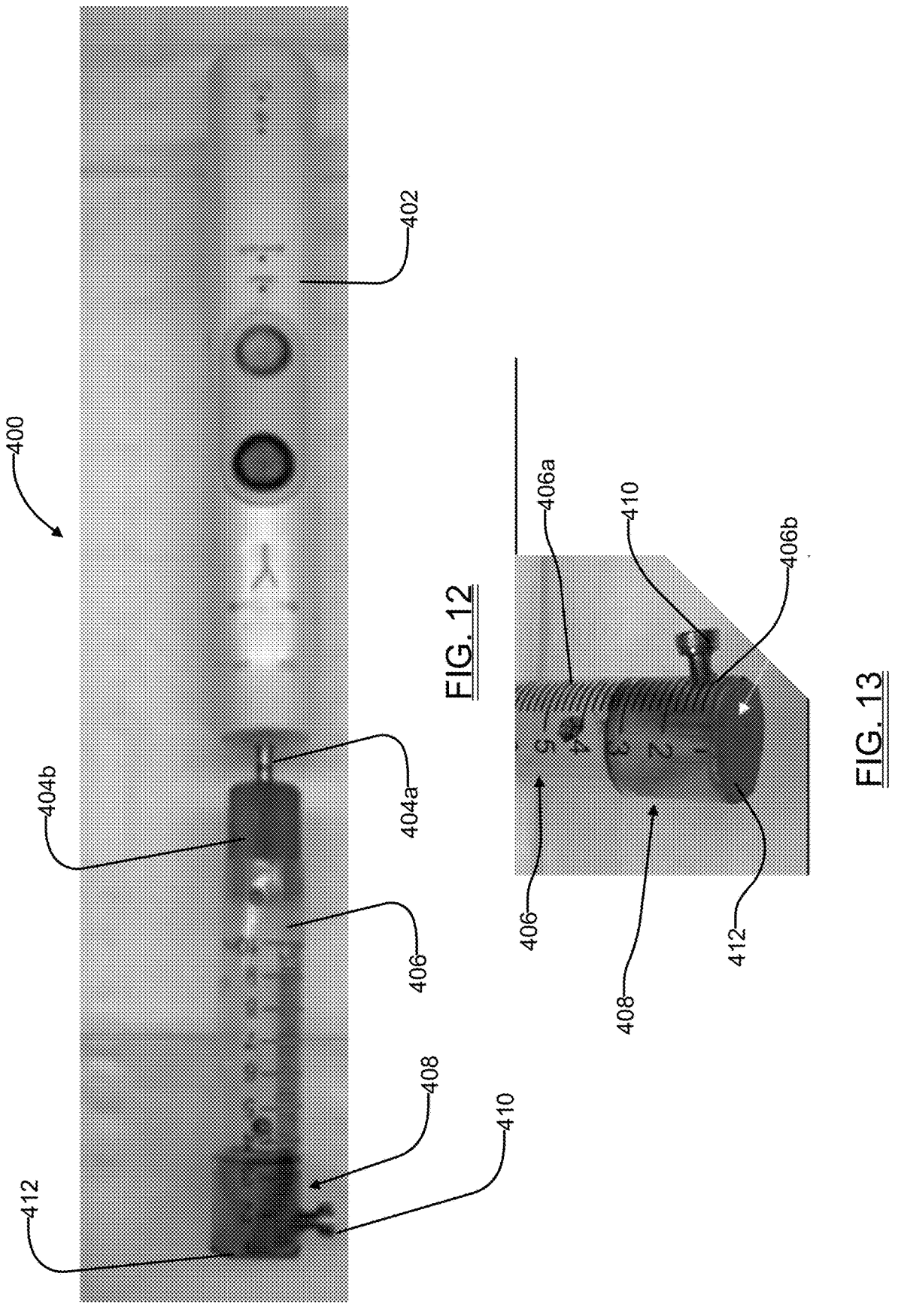
FIG. 12 is a side elevation view of one embodiment of an applicator of the present disclosure which uses sonic or ultrasonic energy to dispense the final powder mixture from a syringe thereof.
FIG. 13 is an enlarged perspective view of just a distal end of the syringe of FIG. 12 illustrating in enlarged fashion a removable frit secured to the syringe of the applicator.

Referring now to FIGS. 12 and 13, a new ultrasonic powder applicator 400 is shown for applying the fully mixed powder mixture described above. In one embodiment the applicator 400 includes a sonic transducer subsystem 402 which includes a rod-like element 404a coupled to a plug-like member 404b, where the plug-like member 404b is in communication with a proximal end of a syringe 406. The syringe 406 is used to hold a quantity of the fully mixed powder. The sonic transducer subsystem 402 may include controls for ON/OFF operation, and may be powered by an external power source (either AC or DC) coupled via an electrical cable, or optionally battery powered via an internally housed DC battery. Optionally, ON/OFF operation of the sonic transducer subsystem 402 may also be controlled by a suitable external/remote controller, such as the ECS 14 shown in FIG. 1, assuming suitable wired or wireless components are employed with the applicator 400.

In one embodiment the syringe 406 may include a removable frit 408 secured at a distal end thereof. In one embodiment the removable frit 408 preferably has an outer diameter just slightly smaller than an inner diameter of the syringe 406, such that the frit is able to be inserted into a distal end of the syringe with minimal or no play therebetween. The removable frit 408 may be secured by using a manually engageable set screw 410 which is threaded into a threaded opening 406b in a sidewall 406a of the syringe 406 and engages a sidewall portion of the frit 408. Optionally, the frit 408 could be more permanently secured using an adhesive, or alternatively by any other suitable means.

The frit 408 further may include a screen portion 412 having a plurality of openings of a selected diameter. The openings in the screen portion 412 are preferably sized to be just slightly larger than the diameter of the powder particles being dispensed from the syringe 406. Optionally, in another embodiment of the applicator 400 the frit 408 may be manufactured as an integral portion of the syringe 406 rather than as a fully separate component. When the frit 408 is manufactured as a fully separate component, however, then it becomes possible to remove the frit and easily replace it with a different frit having different diameter openings in a screen portion thereof. This makes it possible to quickly reconfigure the applicator 400 to use different diameter powders, if needed, during an AM sintering process. For example different powder diameters might be selected for different layers or groups of layers of a part to impart different physical characteristics (e.g., density) to the finished 3D AM printed part. Still further, in another embodiment a plurality of syringes may be provided, with each one having an integrally formed frit having different sized openings. All of the foregoing different embodiments are contemplated by the present disclosure.

In one embodiment the sonic transducer subsystem 402 generates a signal of preferably at least about 100 Hz, and in some embodiments between 100 Hz-1 kHz, and in some embodiments between 1 kHz and 20 kHz, and in some embodiments between 20 kHz and 50 kHz. Regardless of the specific frequency used, when sonic or ultrasonic energy is applied to the rod-like element 404, this causes an oscillating motion of the syringe 406, which controllably releases powder through the screen portion 412 of the frit 408 onto a metal material layer (e.g., Al foil substrate). Either the applicator 400 can be moved along X and Y axes using a suitable structure (e.g., gantry movable along X and Y axes) while being controlled to deposit powder, or a build plate on which the metal substrate layer is supported may be moved along X and Y axes (e.g., by X and Y axis stepper motors, linear actuators, etc.) as needed while a 3D part is being formed. Still further, both the applicator and the build plate could be moved in tandem or alternately as needed to deposit the fully mixed powder along desired paths on the metal substrate. The applicator 400 and its ability to provide a highly controlled, uniform flow of powder therefrom is especially useful when using the applicator in an enclosed environment for air sensitive materials. Since the applicator 400 can be used easily even with very small powder quantities (e.g., just a few grams), it is also particularly useful for initial trials and prototyping work.

When sintering a powder layer laid down using the applicator 400, one configuration of a suitable sintering system may employ a diode laser. In the experiments performed using the applicator 400, a diode laser having a wavelength of 455 nm, a power of 2 watts, and a beam size (e.g., diameter) of 50-100 µm was used to sinter a NMC811/PVDF/CB powder mixture onto Al foil. For certain experiments a Sintratec selective laser sintering 3D printing system was used (commercially available from Sintratec AG of Badenerstrasse 13, 5200 Brugg, Switzerland). With this system, the chamber and powder surface temperature can be set up to 200° C. depending on the melting/glass transition temperature of the polymer binder(s) being used. Through experiments performed using the applicator 400, it has been found that a lower-than-melting-point temperature helps the adhesion of powders to the metal substrate layer. In various experiments using the applicator 400 a scan speed of between 100 mm/s to 500 mm/s was used to deposit the powder mixture onto an Al foil layer of material, and the powder mixture was successfully attached to an Al foil. Adhesion strength was evaluated using air blowing and tape striping tests, which showed tunable adhesion depending on the volumetric energy dosed to the powder layer.

The above described systems and methods thus enable the creation of a powder mixture having excellent homogeneity, which helps to provide excellent electrical performance and excellent adhesion to an underlying metal substrate. As such, the systems and methods described herein are expected to find particular utility in SLS AM applications when used to print components required to perform some electrical function, and particularly in manufacturing components used to form batteries.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for creating a powder for use in a selective laser sintering additive manufacturing (AM) application to form a battery component, the method comprising:

providing a battery component active material, a carbon material and a binder material;

mixing the battery component active material and the binder material together in a first ratio in a mixer for a first time period, to carry out a first mixing operation, to produce a first mixture of battery component active material and binder material; and adding the carbon material to the first mixture of battery component active material and binder material in a second ratio, and mixing the carbon material with the first mixture of battery component active material and binder material for a second time period in a second mixing operation to form a homogeneously mixed powder.

2. The method of claim 1, wherein the battery component active material comprises a dry powder consisting of Lithium Nickel Manganese Cobalt Oxide (NMC).

3. The method of claim 1, wherein the battery component active material comprises a cathode active material, and wherein the cathode active material comprises a dry powder of at least one of:

NMC 811;
NMC 622;
NMC 532;
NMC111;
NCA (Lithium Nickel Cobalt Aluminum Oxide);
LCO (Lithium Cobalt Oxide);
LFP (Lithium Iron Phosphate); or
a mixture thereof.

4. The method of claim 1, wherein the carbon material comprises at least one of carbon black, graphite, graphene, carbon nanotubes, carbon fibers or a mixture thereof.

5. The method of claim 1, wherein the binder comprises Polyvinylidene (PVDF).

6. The method of claim 1, wherein the binder comprises at least one of:

Peracetic acid (PAA);
Carboxymethyl cellulose (CMC);
Polytetrafluorethylene (PTFE);
Halide based solid state electrolytes;
Oxyhalide based solid state electrolytes;
Sulfide based solid state electrolytes;
Oxide based solid state electrolytes; or
a mixture thereof.

7. The method of claim 1, wherein the first ratio comprises a ratio of 70:20 to 90:2 of active material and binder.

8. The method of claim 1, wherein the second ratio comprises a ratio of 10:90 to 2:98 of carbon material to the first mixture of active material and binder material.

9. The method of claim 1, wherein the first time period comprises a range of between 6-24 hours.

10. The method of claim 1, wherein the second time period comprises a range of between 1-8 hours.

11. The method of claim 1, wherein mixing the active material and the binder material together comprises mixing the active material and the binder material together in a roller mixer.

12. The method of claim 11, further comprising using a plurality of mixing components in the mixer during the first and second mixing operations to assist in creating the first mixture of active material and binder material and the fully mixed powder.

13. The method of claim 12, wherein the using of a plurality of mixing components comprises using a plurality of mixing balls of acrylic/Al2O3/YSZ.

14. The method of claim 11, wherein the roller mixer is rotated at a rotational speed of 50-100 rpm during each of the first and second predetermined time periods.

15. A method for creating a powder for use in a selective laser sintering additive manufacturing (AM) application to form a battery cathode, the method comprising:

providing a cathode active material, a carbon material and a binder material;

mixing the cathode active material and the binder material together in a first ratio in a roller mixer for a first time period at a first rotational speed, to produce a first mixture of active material and binder material, the first ratio including a ratio of from 70:20 to 90:2 of the cathode active material and the binder material;

adding the carbon material to the first mixture of cathode active material and binder material in a second ratio in the roller mixer, the second ratio including a ratio of 10:90 to 2:98 of the carbon material and the first mixture of cathode active material and binder material; and mixing the carbon material with the first mixture of cathode active material and binder material in the roller mixer at a second predetermined speed for a second time period to form a homogeneous powder mixture.

16. The method of claim 15, wherein the cathode active material comprises a dry powder including at least one of:

NMC 811;
NMC 622;
NMC 532;
NMC111;
NCA (Lithium Nickel Cobalt Aluminum Oxide);
LCO (Lithium Cobalt Oxide);
LFP (Lithium Iron Phosphate); or
a mixture thereof.

17. The method of claim 15, wherein the binder comprises at least one of:

Polyvinylidene (PVDF);
Peracetic acid (PAA);
Carboxymethyl cellulose (CMC);
Polytetrafluorethylene (PTFE);
Halide based solid state electrolytes;
Oxyhalide based solid state electrolytes;
Sulfide based solid state electrolytes;
Oxide based solid state electrolytes; or
a mixture thereof.

18. The method of claim 15, wherein the carbon material comprises at least one of carbon black, graphite, or a mixture thereof.

19. The method of claim 15, wherein:

the first and second rotational speeds are within a range of 50-100 rpm;

the first predetermined time period is between 6-24 hours; and the second predetermined time period is from 1-8 hours.

* * * * *